US012657436B2

(12) United States Patent (10) Patent No.: US 12,657,436 B2
Schuster et al. (45) **Date of Patent: \*Jun. 16, 2026**

(54) EFFICIENT DECODING OF OUTPUT SEQUENCES USING ADAPTIVE EARLY EXITING

(71) Applicant: Google LLC, Mountain View, CA (US)

(72) Inventors: Tal Schuster, New York, NY (US); Adam Joshua Fisch, Cambridge, MA (US); Jai Prakash Gupta, Fremont, CA (US); Mostafa Dehghani, Amsterdam (NL); Dara Bahri, Lafayette, CA (US); Vinh Quoc Tran, New York, NY (US); Yi Tay, Singapore (SG); Donald Arthur Metzler, Jr., Marina del Rey, CA (US)

(73) Assignee: Google LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/426,212

(22) Filed: Jan. 29, 2024

(65) Prior Publication Data

US 2024/0169184 A1 May 23, 2024

Related U.S. Application Data

(63) Continuation of application No. 18/222,395, filed on Jul. 14, 2023, now Pat. No. 11,886,976.

(60) Provisional application No. 63/389,209, filed on Jul. 14, 2022.

(51) Int. Cl.
*G06N 3/0455* (2023.01)

(52) U.S. Cl.
CPC .................................. *G06N 3/0455* (2023.01)

(58) Field of Classification Search
CPC ....... G06N 3/0455; G06N 3/0475; G06N 3/09
USPC .................................... 706/27, 26; 712/1, 43
See application file for complete search history.

(56) References Cited

U.S. PATENT DOCUMENTS

| | | | |
|---|---|---|---|
| 2017/0140753 A1* | 5/2017 | Jaitly | G10L 15/26 |
| 2019/0026639 A1* | 1/2019 | Vasudevan | G06N 3/082 |
| 2019/0180168 A1 | 6/2019 | Barad et al. | |
| 2019/0266236 A1 | 8/2019 | Battach et al. | |
| 2020/0342316 A1* | 10/2020 | Shazeer | G06N 3/0495 |
| 2021/0012178 A1 | 1/2021 | Venkatesh et al. | |
| 2021/0019604 A1* | 1/2021 | Corrado | G06N 3/063 |
| 2021/0056422 A1* | 2/2021 | Thakker | G06F 17/18 |
| 2022/0358358 A1 | 11/2022 | Raje et al. | |
| 2022/0398451 A1 | 12/2022 | Surya et al. | |
| 2024/0104353 A1* | 3/2024 | Leblond | G06N 3/045 |

OTHER PUBLICATIONS

Angelopoulos et al., "A Gentle Introduction to Conformal Prediction and Distribution-Free Uncertainty Quantification," CoRR, Submitted on Dec. 7, 2022, arXiv: 2107.07511, 51 pages.

(Continued)

*Primary Examiner* — Juan A Torres
(74) *Attorney, Agent, or Firm* — Fish & Richardson P.C.

(57) ABSTRACT

Methods, systems, and apparatus, including computer programs encoded on computer storage media, for generating output sequences using auto-regressive decoder neural networks. In particular, during generation, adaptive early exiting is used to reduce the time required to generate the output sequence.

20 Claims, 5 Drawing Sheets

(56) References Cited

OTHER PUBLICATIONS

Angelopoulos et al., "Image-to-Image Regression with Distribution-Free Uncertainty Quantification and Applications in Imaging," Proceedings of the 39th International Conference on Machine Learning, Jul. 2022, 14 pages.

Angelopoulos et al., "Learn then Test: Calibrating Predictive Algorithms to Achieve Risk Control," CoRR, Submitted on Sep. 29, 2022, arXiv:2110.01052, 35 pages.

Aribandi et al., "ExT5: Towards Extreme Multi-Task Scaling for Transfer Learning," CoRR, Submitted on Jan. 29, 2022, arXiv: 2111.10952, 28 pages.

Bai et al., "BinaryBERT: Pushing the Limit of BERT Quantization," CoRR, Submitted Jul. 22, 2021, arXiv: 2012.15701, 15 pages.

Bai et al., "Efficient and Differentiable Conformal Prediction with General Function Classes," CoRR, Submitted on May 29, 2022, arXiv: 2202.11091, 33 pages.

Baier-Reinio et al., "N-ODE Transformer: A Depth-Adaptive Variant of the Transformer Using Neural Ordinary Differential Equations," CoRR, arXiv:2010.11358, Oct. 22, 2020, 16 pages.

Bakhtiarnia et al., "Single-Layer Vision Transformers for More Accurate Early Exits with Less Overhead" CoRR, Submitted Jun. 29, 2022, arXiv: 2105.09121, 15 pages.

Bapna et al., "Controlling Computation versus Quality for Neural Sequence Models," CoRR, Submitted on Apr. 16, 2020, arXiv: 2002.07106, 13 pages.

Bates et al., "Distribution-free, Risk-controlling Prediction Sets," Journal of the ACM, Sep. 30, 2021, 34 pages.

Bauer, "Multiple testing in clinical trials," Statistics in Medicine, Jun. 1991, 10:871-890.

Bentkus, "On Hoeffding's inequalities," CoRR, Submitted on Oct. 6, 2004, arXiv: 0410159, 26 pages.

Bojar et al., "Findings of the 2014 Workshop on Statistical Machine Translation," Proceedings of the Ninth Workshop on Statistical Machine Translation, Jun. 2014, pp. 12-58.

Brown et al., "Language Models are Few-Shot Learners," Advances in Neural Information Processing Systems, 2020, 25 pages.

Cambazoglu et al., "Early exit optimizations for additive machine learned ranking systems," WSDM '10: Proceedings of the third ACM international conference on Web search and data mining, Feb. 2010, pp. 411-420.

Chowdhery et al., "PaLM: Scaling Language Modeling with Pathways," CoRR, Submitted on Oct. 5, 2022, arXiv: 2204.02311, 87 pages.

Cooper Stickland et al., "BERT and PALs: Projected Attention Layers for Efficient Adaptation in Multi-Task Learning," Proceedings of the 36th International Conference on Machine Learning, 2019, 10 pages.

Dehghani et al., "The Efficiency Misnomer," ICLR, Jan. 28, 2022, 16 pages.

Dehghani et al., "Universal Transformers," CoRR, Submitted on Mar. 5, 2019, arXiv: 1807.03819, 23 pages.

Devlin et al., "BERT: Pre-training of Deep Bidirectional Transformers for Language Understanding," CoRR, Submitted on May 24, 2019, arXiv: 1810.04805, 16 pages.

Dey et al., "Conformal prediction for text infilling and part-of-speech prediction," CoRR, Submitted on Nov. 4, 2021, arXiv: 2111.02592, 14 pages.

Dong, "Resource-Constrained Edge AI with Early Exit Prediction" CoRR, Submitted on Jun. 19, 2022, arXiv: 2206.0726, 26 pages.

Du et al., "GLaM: Efficient Scaling of Language Models with Mixture-of-Experts," CoRR, Submitted on Aug. 1, 2022, arXiv: 2112.06905, 23 pages.

Elbayad et al., "Depth-Adaptive Transformer," CoRR, Submitted on Feb. 14, 2020, arXiv: 1910.10073, 15 pages.

Fan et al., "Reducing Transformer Depth on Demand with Structured Dropout," CoRR, Submitted on Sep. 25, 2019, arXiv: 1909.11556, 15 pages.

Figurnov et al., "Probabilistic Adaptive Computation Time," CoRR, Submitted on Dec. 1, 2017, arXiv: 1712.00386, 12 pages.

Fisch et al., "Conformal Prediction Sets with Limited False Positives," CoRR, Submitted on Feb. 15, 2022, arXiv: 2202.07650, 18 pages.

Fisch et al., "Efficient Conformal Prediction via Cascaded Inference with Expanded Admission," CoRR, Submitted on Feb. 2, 2021, arXiv: 2007.3114, 21 pages.

Geva et al., "Transformer Feed-Forward Layers Build Predictions by Promoting Concepts in the Vocabulary Space," CoRR, Submitted on Oct. 12, 2022, arXiv: 2203.14680, 16 pages.

github.com [online], "BIG-bench collaboration. Beyond the imitation game: Measuring and extrapolating the capabilities of language models," 2021, retrieved on Oct. 5, 2023, retrieved from URL<https://github.com/google/BIG-bench>, 11 pages.

github.com [online], "JAX: composable transformations of Python+NumPy programs," 2018, retrieved on Oct. 5, 2023, retrieved from URL<http://github.com/google/jax>, 10 pages.

Gormez et al., "E2CM: Early Exit via Class Means for Efficient. Supervised and Unsupervised Learning" CoRR, Submitted on Jul. 11, 2022, arXiv: 2103.01148, 8 pages.

Gormez et al., "Pruning Early Exit Networks" CoRR, Submitted on Jul. 8, 2022, arXiv: 2207.03644, 5 pages.

Gulcehre et al., "On integrating a language model into neural machine translation," Computer Speech & Language, Sep. 2017, 45:137-148.

Hermann et al., "Teaching Machines to Read and Comprehend," Advances in Neural Information Processing Systems, 2015, 9 pages.

Hinton et al., "Distilling the Knowledge in a Neural Network," CoRR, Submitted on Mar. 9, 2015, arXiv: 1503.02531, 9 pages.

Hoeffding, "Probability Inequalities for sums of Bounded Random Variables," Journal of the American Statistical Association, 1963, 58:13-30.

Hou et al., "DynaBERT: Dynamic BERT with Adaptive Width and Depth," Advances in Neural Information Processing Systems, 2020, 12 pages.

Jiao et al., "TinyBERT: Distilling BERT for Natural Language Understanding," CoRR, Submitted on Oct. 16, 2020, arXiv: 1909.10351, 12 pages.

Kim et al., "Length-Adaptive Transformer: Train Once with Length Drop, Use Anytime with Search," CoRR, Submitted on Jun. 11, 2021, arXiv: 2010.07003, 11 pages.

Kudugunta et al., "Beyond Distillation: Task-level Mixture-of-Experts for Efficient Inference," CoRR, Submitted on Sep. 24, 2021, arXiv: 2110.03742, 23 pages.

Lakim et al., "A Holistic Assessment of the Carbon Footprint of Noor, a Very Large Arabic Language Model," Proceedings of BigScience Episode #5—Workshop on Challenges & Perspectives in Creating Large Language Models, May 2022, pp. 84-94.

Laskaridis et al., "Adaptive Inference through Early-Exit Networks: Design, Challenges and Directions," CoRR, Submitted on Jun. 9, 2021, arXiv: 2106.05022, 6 pages.

Lei, "When Attention Meets Fast Recurrence: Training Language Models with Reduced Compute," CoRR, Submitted on Sep. 15, 2021, arXiv: 2102.12459, 16 pages.

Lepikhin et al., "GShard: Scaling Giant Models with Conditional Computation and Automatic Sharding," ICLR, Jan. 12, 2021, 23 pages.

Li et al, "Accelerating BERT Inference for Sequence Labeling via Early-Exit," CoRR, Submitted on Jun. 14, 2021, arXiv: 2105.13878, 11 pages.

Li et al., "CascadeBERT: Accelerating Inference of Pre-trained Language Models via Calibrated Complete Models Cascade," arXiv, Sep. 3, 2021, 12 pages.

Liu et al., "FastBERT: a Self-distilling BERT with Adaptive Inference Time," arXiv, Apr. 29, 2020, 10 pages.

Liu et al., "Faster Depth-Adaptive Transformers," AAAI Technical Track on Speech and Natural Language Processing II, May 18, 2021, 9 pages.

Liu et al., "Towards Efficient NLP: A Standard Evaluation and a Strong Baseline," arXiv, Apr. 10, 2022, 16 pages.

(56) References Cited

OTHER PUBLICATIONS

Lu et al., "Distribution-Free Federated Learning with Conformal Predictions," CoRR, Submitted on Jan. 15, 2022, arXiv: 2110.07661, 6 pages.

Moosavi et al., "Proceedings of SustaiNLP: Workshop on Simple and Efficient Natural Language Processing," Nov. 2022, 12 pages.

Pacheco, "Early-exit deep neural networks for distorted images: providing an efficient edge offloading" CoRR, Submitted Aug. 25, 2021, 7 pages.

Papineni et al., "BLEU: a Method for Automatic Evaluation of Machine Translation," Proceedings of the 40th Annual Meeting of the Association for Computational Linguistics (ACL), Jul. 2002, pp. 311-318.

Peters et al., "Deep contextualized word representations," Proceedings of the 2018 Conference of the North American Chapter of the Association for Computational Linguistics: Human Language Technologies, Jun. 2018, pp. 2227-2237.

Qendro, "High Frequency EEG Artifact Detection with Uncertainty via Early Exit Paradigm" CoRR, arXiv: 2107.10746, Jul. 21, 2021, 8 pages.

Radford et al., "Language models are unsupervised multitask learners," OpenAI, 2019, 24 pages.

Rae et al., "Scaling Language Models: Methods, Analysis & Insights from Training Gopher," CoRR, Submitted on Jan. 21, 2022, arXiv: 2112.11446, 120 pages.

Raffel et al., "Exploring the Limits of Transfer Learning with a Unified Text-to-Text Transformer," CoRR, Submitted on Sep. 19, 2023, arXiv: 1910.10683, 67 pages.

Rajpurkar et al., "SQuAD: 100,000+ Questions for Machine Comprehension of Text," CoRR, Submitted on Oct. 11, 2016, arXiv: 1606.05250, 10 pages.

Roberts et al., "Scaling Up Models and Data with t5x and seqio," CoRR, Submitted on Mar. 31, 2022, arXiv: 2203.17189, 12 pages.

Sabet et al., "Temporal Early Exits for Efficient Video Object Detection" CoRR, Submitted on Jun. 21, 2021, arXiv: 2106.11208, 11 pages.

Saeed, "Binary Early-Exit Network for Adaptive Inference on Low-Resource Devices" CoRR, Submitted on Jun. 17, 2022, arXiv: 2206.09029, 5 pages.

Sanh et al., "DistilBERT, a distilled version of BERT: smaller, faster, cheaper and lighter," CoRR, Submitted on Mar. 1, 2020, arXiv: 1910.01108, 5 pages.

Schuster et al., "Consistent Accelerated Inference via Confident Adaptive Transformers," CoRR, Submitted on Sep. 9, 2021, arXiv: 2104.08803, 18 pages.

Schuster et al., "Programming Puzzles," CoRR, Submitted on Nov. 6, 2021, arXiv: 2106.05784, 38 pages.

Schwartz et al., "Green AI," Communications of the ACM, Dec. 2020, 63(12):54-63.

Schwartz et al., "The Right Tool for the Job: Matching Model and Instance Complexities," CoRR, Submitted on May 9, 2020, arXiv: 2004.01453, 12 pages.

Sellam et al., "Bleurt: Learning Robust Metrics for Text Generation," CoRR, Submitted on May 21, 2020, arXiv: 2004.04696, 12 pages.

Shafer et al., "A Tutorial on Conformal Prediction," Journal of Machine Learning Research, Mar. 2008, 9:371-421.

Sharir et al., "The Cost of Training NLP Models: A Concise Overview," CoRR, Submitted on Apr. 19, 2020, arXiv: 2004.08900, 6 pages.

Shazeer et al., "Adafactor: Adaptive learning rates with sublinear memory cost," CoRR, Submitted on Apr. 11, 2018, arXiv: 1804.04235, 9 pages.

Shen et al., "Q-BERT: Hessian Based Ultra Low Precision Quantization of BERT," AAAI Technical Track: Natural Language Processing, Apr. 3, 2020, 7 pages.

Simoulin et al., "How Many Layers and Why? An Analysis of the Model Depth in Transformers," Proceedings of the 59th Annual Meeting of the Association for Computational Linguistics and the 11th International Joint Conference on Natural Language Processing: Student Research Workshop, Aug. 2021, pp. 221-228.

Sun et al., "A Simple Hash-Based Early Exiting Approach for Language Understanding and Generation," CoRR, Submitted on Mar. 3, 2022, arXiv: 2203.01670, 13 pages.

Sun et al., "MobileBERT: a Compact Task-Agnostic BERT for Resource-Limited Devices," CoRR, Submitted on Apr. 14, 2020, arXiv: 2004.02984, 13 pages.

Sun et al., "Patient Knowledge Distillation for BERT Model Compression," CoRR, Submitted on Aug. 25, 2019, arXiv: 1908.09355, 10 pages.

Sun, "A Simple Hash-Based Early Exiting Approach for Language Understanding and Generation" CoRR, Submitted on Mar. 3, 2022, arXiv: 2203.01670, 13 pages.

Tay et al., "Efficient Transformers: A Survey," ACM Computing Surveys, Dec. 7, 2022, 55(6):1-28.

Tay et al., "UL2: Unifying Language Learning Paradigms," CoRR, Submitted on Feb. 28, 2023, arXiv: 2205.05131, 39 pages.

Teerapittayanon et al., "BranchyNet: Fast inference via early exiting from deep neural networks," Presented at 23rd International Conference on Pattern Recognition (ICPR), Dec. 4-8, 2016, Cancun, Mexico, pp. 2464-2469.

Termritthikun, "EEEA-N ET: an early exit evolutionary neural architecture search," CoRR, Submitted on Aug. 13, 2021, arXiv: 2108.06156, 26 pages.

Thoppilan et al., "LaMDA: Language Models for Dialog Applications," CoRR, Submitted on Feb. 10, 2022, arXiv: 2201.08239, 47 pages.

Vaswani et al., "Attention is all you need," CoRR, Submitted on Aug. 2, 2023, arXiv: 1706.03762, 15 pages.

Wang et al., "MiniLM: Deep Self-Attention Distillation for Task-Agnostic Compression of Pre-Trained Transformers," Advances in Neural Information Processing Systems, 2020, 13 pages.

Wang et al., "SkipNet: Learning Dynamic Routing in Convolutional Networks," Proceedings of the European Conference on Computer Vision (ECCV), Sep. 2018, pp. 409-424.

Wei et al., "Chain-of-Thought Prompting Elicits Reasoning in Large Language Models," Advances in Neural Information Processing Systems, Nov.-Dec. 2022, 14 pages.

Wieting et al., "Beyond BLEU: Training Neural Machine Translation with Semantic Similarity," CoRR, Submitted Sep. 14, 2019, arXiv: 1909.06694, 12 pages.

Woiczyk et al., "Zero TimeWaste: Recycling Predictions in Early Exit Neural Networks" CoRR, Submitted on Dec. 5, 2021, 23 pages.

Wu et al., "Memorizing Transformers," CoRR, Submitted on Mar. 16, 2022, arXiv: 2203.08913, 19 pages.

Xie, "Elbert: fast albert with confidence-window based early exit," CoRR, Submitted on Jul. 1, 2021, 6 pages.

Xin et al., "BERxiT: Early Exiting for BERT with Better Fine-Tuning and Extension to Regression," Proceedings of the 16th Conference of the European Chapter of the Association for Computational Linguistics: Main Volume, Apr. 2021, 14 pages.

Xin et al., "DeeBERT: Dynamic Early Exiting for Accelerating BERT Inference," CoRR, Submitted on Apr. 27, 2020, arXiv: 2004.12993, 6 pages.

Xu et al., "A Survey on Green Deep Learning," CoRR, Submitted on Nov. 10, 2021, arXiv: 2111.05193, 61 pages.

Xue et al., "ByT5: Towards a Token-Free Future with Pre-trained Byte-to-Byte Models," Transactions of the Association for Computational Linguistics, Mar. 25, 2022, 10:291-306.

Yin et al., "AdaViT: Adaptive Tokens for Efficient Vision Transformer," CoRR, Submitted on Oct. 5, 2022, arXiv: 2206.14413, 12 pages.

Yoon, "HuBERT-EE: Early Exiting HuBERT for Efficient Speech Recognition" CoRR, Submitted on Apr. 13, 2022, arXiv: 2204.06328, 5 pages.

Zaffran et al., "Adaptive Conformal Predictions for Time Series," Proceedings of the 39th International Conference on Machine Learning, Jul. 2022, 33 pages.

Zhang et al., "OPT: Open Pre-trained Transformer Language Models," CoRR, Submitted on Jun. 21, 2022, arXiv: 2205.01068, 30 pages.

(56)             References Cited

OTHER PUBLICATIONS

Zhou et al., "BERT Loses Patience: Fast and Robust Inference with Early Exit," Advances in Neural Information Processing Systems, 2020, 12 pages.

Zhou et al., "Mixture-of-Experts with Expert Choice Routing," Advances in Neural Information Processing Systems, Nov.-Dec. 2022, 12 pages.

Zhu, "LeeBERT: Learned Early Exit for BERT with cross-level optimization," Proceedings of the 59th Annual Meeting of the Association for Computational Linguistics and the 11th International Joint Conference on Natural Language Processing (vol. 1: Long Papers), Aug. 2021, 13 pages.

Gu et al., "Levenshtein Transformer" CoRR, Submitted on May 27, 2019, arXiv:1905.11006v1, 16 pages.

International Preliminary Report on Patentability in International Appln. No. PCT/US2023/027799, mailed on Jan. 23, 2025, 12 pages.

\* cited by examiner

200

202 — GENERATE CURRENT INPUT SEQUENCE

204 — GENERATE HIDDEN STATES

206 — PROCESS HIDDEN STATES UNTIL TERMINATION CRITERION IS SATISFIED

208 — ONCE TERMINATION CRITERION SATISFIED, GENERATE PROBABILITY DISTRIBUTION

210 — SELECT TOKEN USING PROBABILITY DISTRIBUTION

400

RECEIVE INPUT DEFINING TOLERANCE CONSTRAINT VALUE ⟍402

DETERMINE CANDIDATE VALUES ⟍404

SELECT, AS SHARED THRESHOLD VALUE, LOWEST CANDIDATE VALUE THAT RESULTS IN THRESHOLD VALUES THAT SATISFY THE TOLERANCE CONSTRAINT ⟍406

150

502

EFFICIENT DECODING OF OUTPUT SEQUENCES USING ADAPTIVE EARLY EXITING

CROSS-REFERENCE TO RELATED APPLICATIONS

This is a continuation application of U.S. application Ser. No. 18/222,395, filed on Jul. 14, 2023, which claims priority to U.S. Provisional Application No. 63/389,209, filed on Jul. 14, 2022. The disclosures of the prior applications are considered part of and are incorporated by reference in the disclosure of this application.

BACKGROUND

This specification relates to processing inputs using neural networks to generate output sequences.

Neural networks are machine learning models that employ one or more layers of nonlinear units to predict an output for a received input. Some neural networks include one or more hidden layers in addition to an output layer. The output of each hidden layer is used as input to the next layer in the network, i.e., another hidden layer or the output layer. Each layer of the network generates an output from a received input in accordance with current values of a respective set of parameters.

SUMMARY

This specification describes a system implemented as computer programs on one or more computers in one or more locations that performs a machine learning task on a network input using a decoder neural network.

In particular, the system generates an output sequence that includes a respective token from a vocabulary of tokens at each of a plurality of output time steps.

While generating the output sequence, the system can perform "early exiting." Early exiting refers to generating an output token using the output of an intermediate layer of the decoder neural network rather than the last layer of the decoder neural network. Performing early exiting can make the generation of the token more computationally efficient because the computation of any layers after the intermediate layer does not need to be performed.

The "early exiting" is referred to as "adaptive" because the system determines to use the output of the intermediate layer for a given output token only when a termination criterion is satisfied. If the termination criterion is not satisfied for any of the intermediate layers when generating the given output token, the system uses the output of the last layer to generate the given output token.

The subject matter described in this specification can be implemented in particular embodiments so as to realize one or more of the following advantages.

Recent advances in Transformer-based large language models (LLMs) have led to significant performance improvements across many tasks. These gains come with a drastic increase in the models' size, potentially leading to slow and costly use at inference time. In practice, however, the series of generations made by LLMs when generating an output sequence is composed of varying levels of difficulty. While certain predictions truly benefit from the models' full capacity, other continuations are more trivial and can be solved with reduced compute. This specification describes a framework for dynamically allocating different amounts of compute per input and generation time step using "early exit decoding." In particular, in early exit decoding, the system determines, at each time step, when to stop processing and generate the next output token. By using the described framework, the system can reduce compute, e.g., achieving a potential speedup of three times or more while generating an output sequence, while provably maintaining high performance. The system can also reduce latency in the generation process whilst maintaining high performance and can improve the overall throughput of the system using "early exit decoding". The system can also reduce memory usage when processing of subsequent layers is skipped. The system effectively dynamically allocates computational resources as necessary in processing each position/at each time step.

The details of one or more embodiments of the subject matter of this specification are set forth in the accompanying drawings and the description below.

Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
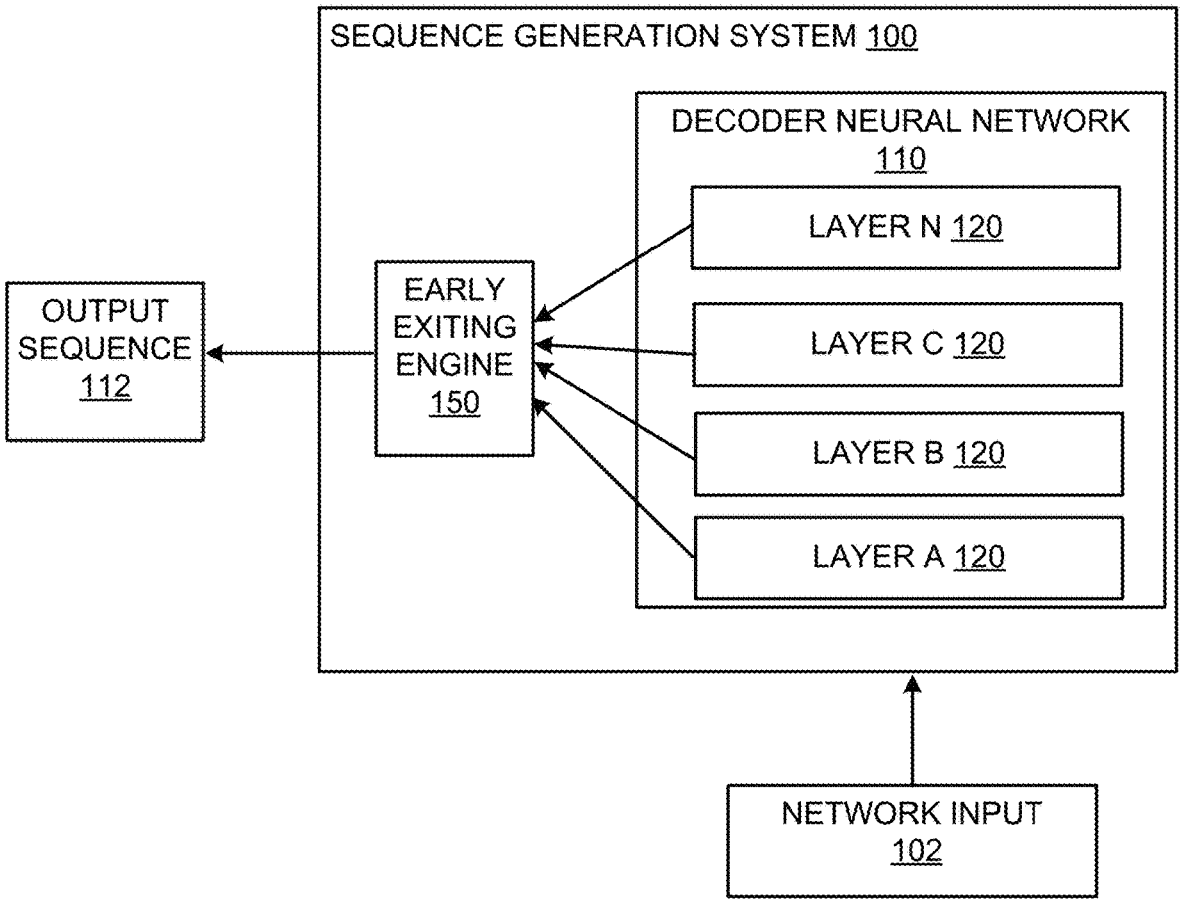
FIG. 1 is a diagram of an example sequence generation system.

FIG. 1 shows an example sequence generation system 100. The sequence generation system 100 is an example of a system implemented as computer programs on one or more computers in one or more locations, in which the systems, components, and techniques described below can be implemented.

The system 100 performs a machine learning task on a network input 102 using a neural network.

The machine learning task can be any machine learning task that generates a network output that is an output sequence 112. That is, the machine learning task requires processing the network input 102 to generate an output sequence 112.

Some examples of machine learning tasks that the system 100 can be configured to perform follow.

As one example, if the input to the neural network is a sequence of text in one language, the output generated by the neural network may a sequence of text in another language that is proper translation of the input text into the other language.

As another example, the task may be an audio processing task.

For example, if the input to the neural network is a sequence representing a spoken utterance, the output generated by the neural network may be a text transcript for the utterance.

As another example, if the input to the neural network is a sequence representing a spoken utterance, the output generated by the neural network can indicate whether a particular word or phrase ("hotword") was spoken in the utterance.

As another example, the task can be a text to speech task, where the input is text in a natural language or features of text in a natural language and the network output is a spectrogram, a waveform, or other data defining audio of the text being spoken in the natural language.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text.

As another example, the input to the text generation task can be an input other than text, e.g., an image, and the output sequence can be text that describes the input. As another example, the input can include both text and other data, e.g., images.

As another example, the task can be a computer code generation task, where the input is a sequence of text describing the functionality of a piece of computer code, or a sequence of computer code to be modified or completed, or both and the output is a sequence of computed code that modifies the computer code, that has the functionality that is described by the sequence of text, or both.

As another example, the task can be an image generation task, where the input is a conditioning input and the output is a sequence of intensity value inputs for the pixels of an image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

To perform the machine learning task, the system 100 uses a neural network that includes an auto-regressive decoder neural network 110 that includes a sequence of multiple layers 120.

Each layer 120 operates on a respective input sequence that includes a respective input vector at each of one or more positions. The input vectors will also be referred to as "hidden states" in this specification.

Moreover, each of the layers 120 includes an attention layer and, in some implementations, a feed-forward layer.

The attention layer receives the input sequence for the layer and applies an attention mechanism on the input sequence for the layer to generate an attended input sequence.

The attention mechanism applied by the attention layer depends on the configuration of the neural network, as will be described in more detail below.

The feed-forward layer, when included, then operates on the attended input sequence to generate an output sequence for the layer.

More specifically, the decoder neural network 110 operates auto-regressively to generate the outputs in the output sequence and, during training, the attention sub-layers within some or all of the layers of the decoder apply masked self-attention (also referred to as "causal" self-attention) over the partially generated output sequence.

In masked self-attention, the attention mechanism is masked so that any given position in the input sequence does not attend over any positions after the given position in the input sequence.

Generally, the layers 120 within the neural network can be arranged in any of a variety of configurations.

As one example, the neural network can include an encoder neural network that encodes the network input 102 to generate an encoded representation of the input, e.g., a sequence of encoded vectors that represent the network input 102. For example, when the input is a sequence, the encoded representation can include a respective embedding of each input in the sequence. The encoder neural network can also be an attention-based neural network or another appropriate type of neural network that maps a network input to an encoded representation.

When the neural network includes both an encoder and a decoder 110, some of the layers in the decoder 110 apply cross-attention into the encoded representations while others apply self-attention over the output sequence.

In some implementations, the decoder neural network 110 operates directly on an input sequence, i.e., the neural network includes only a decoder 110 and not an encoder. For example, the input sequence can be the network input 102 or can have been generated by the network input 102 by another neural network, e.g., by an embedding neural network that transforms the network input 102 into a sequence of tokens.

In these implementations, at each time step, the decoder 110 operates on a combined sequence that includes the input sequence and the currently generated output sequence as of the time step and the layers 120 in the sequence each perform masked self-attention over the combined sequence.

In other words, the decoder neural network 110 is referred to as an auto-regressive neural network because the neural network 110 auto-regressively generates an output sequence of tokens by generating each particular token in the output sequence conditioned on a current input sequence that includes any tokens that precede the particular text token in the output sequence, i.e., the tokens that have already been generated for any previous positions in the output sequence that precede the particular position of the particular token, and, in some cases, a sequence derived from the network input 102.

More specifically, to generate a particular token at a particular position within an output sequence, the neural network 110 can process the current input sequence to generate a probability distribution that assigns a respective score, e.g., a respective probability, to each token in a vocabulary of tokens.

The tokens in the vocabulary can be any appropriate text tokens, e.g., words, word pieces, characters, punctuation marks, and so on, that represent elements of text in one or more natural languages and, optionally, numbers and other text symbols that are found in a corpus of text.

The neural network 110 can then select, as the particular token, a token from the vocabulary using the probability distribution. For example, the neural network 114 can greedily select the highest-scoring token or can sample, e.g., using nucleus sampling or another sampling technique, a token from the distribution.

The decoder neural network 110 includes (i) a plurality of layers that each apply an attention mechanism and (ii) an output subnetwork that processes an output of the last attention block to generate the score distribution.

In other words, the decoder neural network 110 includes a sequence of layers, and, during the processing of a given input sequence, each layer in the sequence receives a respective input hidden state for each input token in the given input sequence. The layer then updates each of the hidden states at least in part by applying an attention mechanism to generate a respective output hidden state for each of the input tokens.

The input hidden states for the first attention block are embeddings of the input tokens in the input sequence and the input hidden states for each subsequent attention block are the output hidden states generated by the preceding attention block.

In this example, the output subnetwork processes the output hidden state generated by the last attention block in the sequence for the last input token in the input sequence to generate the probability distribution. For example, the output subnetwork can include a linear layer followed by a softmax layer. As another example, the output subnetwork can include more layers, e.g., can be a multi-layer perceptron (MLP).

Generally, and unlike conventional systems, to autoregressively generate ("decode") an output sequence using the decoder neural network 110, the system 100 uses an adaptive early exiting scheme to decode output sequences in a computationally efficient manner with reduced latency while still maintaining high output quality.

In order to employ early exiting, the system 100 maintains a respective threshold value for each of the output time steps for each of a subset of the layers 120. Generally, within a given time step, each layer 120 that is in the subset has the same threshold value, but different output time steps have different threshold values.

In some implementations, the subset of the layers 120 includes all of the layers 120 in the sequence other than the last layer in the sequence, i.e., all of the intermediate layers 120 in the sequence.

In some other implementations, the subset of the layers 120 includes less than all of the intermediate layers 120. For example, the subset can include all of the layers 120 in the sequence other than the first layer and the last layer. As another example, the subset can include every other intermediate layer in the sequence. As yet another example, the subset can include all of the layers that apply self-attention but not the layers that apply cross-attention.

The system 100 also augments the neural network with a respective output subnetwork for each of the layers 120 that are in the subset. That is, the decoder neural network 110 includes not only an output subnetwork for the last layer 120 in the sequence, but also a respective output subnetwork for each layer 120 that is in the subset.

The respective output subnetwork for each of the layers 120 is configured to, at any given output time step, process the updated hidden state for the last token in the input sequence for the given output time step after being updated by the layer 120 to generate a probability distribution over the tokens in the vocabulary.

For example, each output subnetwork can have the same architecture as (but different parameter values from) the output subnetwork that processes the output of the last layer 120 in the sequence.

When generating an output token at a given output time step, an early exiting engine 150 within the system 100 uses the maintained threshold values to determine, for each layer in the subset, whether a termination criterion is satisfied.

If the termination criterion is satisfied at a given layer in the subset, the early exiting engine 150 determines to use the output subnetwork for the layer to process the output of the given layer to select the token at the output time step. Thus, the system 100 can perform an "early exit" and refrain from performing the computations of any layers that are after the given layer in the sequence.

If the termination criterion is not satisfied at any of the layers 120 in the subset, the early exiting engine 150 uses the output of the last layer to generate the output token at the output time step, i.e., by processing the output of the layer in the sequence using the output subnetwork for the last layer in the sequence as described above.

Using threshold values to determine whether the termination criterion is satisfied is described in more detail below with reference to FIGS. 2-5.

Prior to using the neural network, the system 100 or another training system trains the neural network, i.e., the decoder neural network 110 and, when included, the encoder neural network.

For example, the neural network can be pre-trained on a language modeling task, e.g., a task that requires predicting, given a current sequence of text tokens, the next token that follows the current sequence in the training data. As a particular example, the neural network can be pre-trained on a maximum-likelihood objective on a large dataset of text, e.g., text that is publicly available from the Internet or another text corpus.

In some implementations, after the pre-training, the system 100 fine-tunes the neural network, e.g., through supervised learning, reinforcement learning, or both, on an objective for the machine learning task.

As another example, the system 100 or the other training system can train the neural network on the objective for the machine learning task without pre-training.

As a particular example, during training on a given objective, i.e., on a pre-training objective or an objective for the task, the system can train the neural network to minimize an overall loss that is a weighted sum of losses for each of the layers in the subset and the last layer.

The loss for each layer in the subset is equal to the given objective evaluated using the output of the output subnetwork corresponding to the layer.

In some implementations, the system can set the weights in the weighted sum to favor the later layers in the sequence, i.e., so that each layer has a higher weight than any layers that precede the layer in the sequence. As a particular example, the weight for any given layer can be equal to or proportional to the index of the layer within the sequence divided by the sum of the indices of the layers in the subset and the last layer. Setting the weights to favor later layers can ensure that the accuracy of the predictions generated from later layers is not degraded by attempting to improve the accuracy of the predictions generated from earlier layers.

Figure 2:
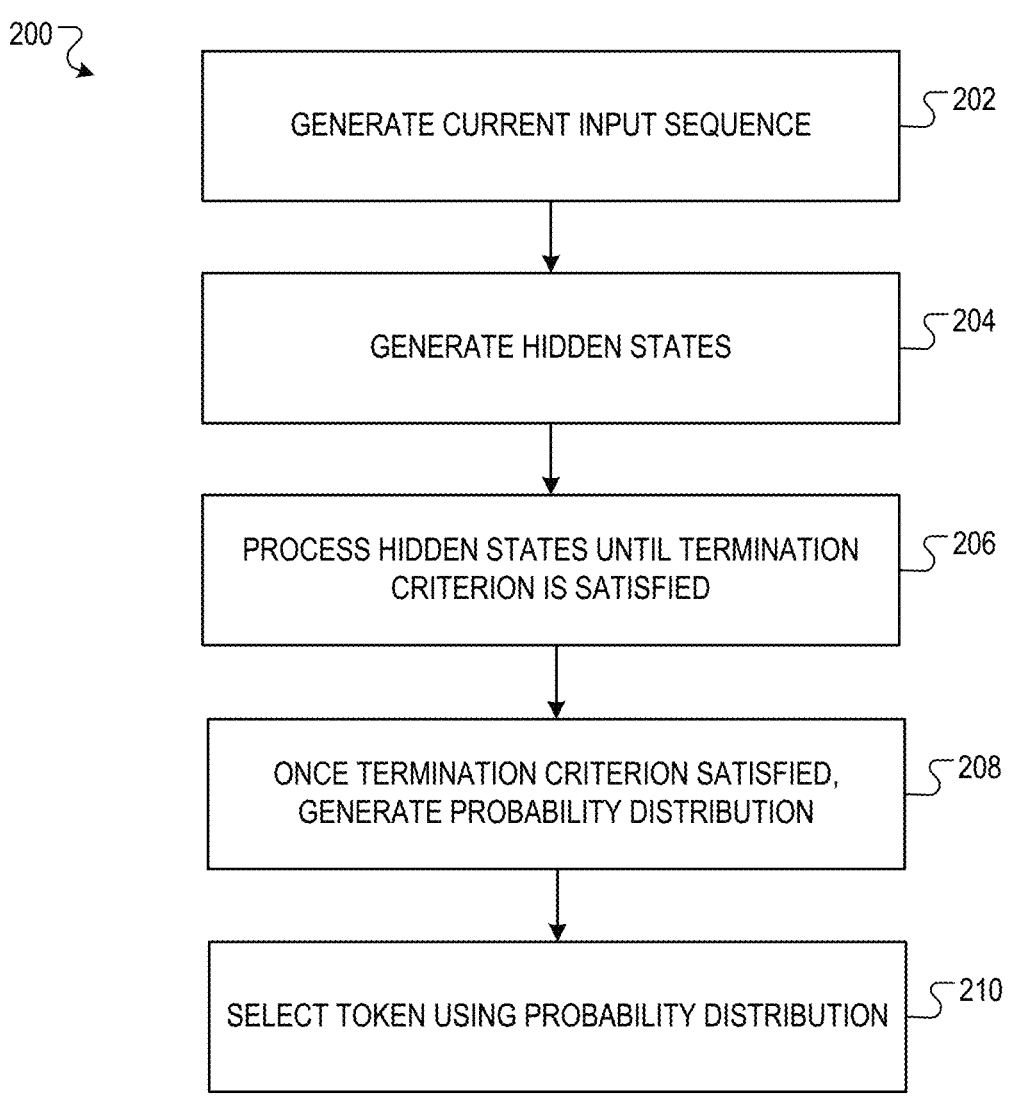
FIG. 2 is a flow diagram of an example process for generating an output sequence.

FIG. 2 is a flow diagram of an example process 200 for generating an output sequence. For convenience, the process 200 will be described as being performed by a system of one or more computers located in one or more locations. For example, a sequence generation system, e.g., the sequence generation system 100 depicted in FIG. 1, appropriately programmed in accordance with this specification, can perform the process 200.

As described above, the output sequence includes a respective token at each of multiple output time steps.

The system can perform the process 200 at each output time step in order to generate the respective token at the output time step.

That is, the system can continue performing the process 200 to add tokens to the output sequence until termination criteria are satisfied, e.g., until the number of tokens in the output sequence reaches a maximum number or until the system selects a predetermined end-of-sequence token from the vocabulary that indicates the end of the output sequence.

The system generates a current input sequence for the output time step from at least the tokens at output time steps that precede the output time step in the output sequence (step 202).

That is, when the decoder is part of a decoder-only neural network, the current input sequence includes one or more input tokens corresponding to the network input, the tokens at output time steps that precede the output time step in the output sequence, and, optionally, one or more designated separator tokens that separate the tokens corresponding to the network input from the already generated tokens. When the decoder is part of an encoder-decoder neural network, the current input sequence includes the tokens at output time steps that precede the output time step in the output sequence and, in some cases, a designated start-of-sequence tokens.

The system generates a respective hidden state for each input in the current input sequence (step 204).

To generate the respective hidden states, the system processes each of the tokens at output time steps that precede the output time step in the output sequence (and any additional tokens in the current input sequence) using an embedding layer.

In some implementations, because only the last token in the output sequence has been added to the current input sequence since the preceding output time step, the system re-uses the respective hidden states (that were previously generated using the embedding layer at earlier time steps) for the other tokens in the current input sequence rather than re-compute the respective hidden states at each time step.

The system processes the respective hidden states for the inputs in the current input sequence through the layers in the sequence of layers until a termination criterion is satisfied (step 206).

As described above, the system maintains respective threshold values for each of the plurality of output time steps for each layer in the subset. The system uses the respective threshold value for the current output time step to determine when the termination criterion is satisfied.

In particular, the system can maintain different threshold values for two or more of the output time steps.

More specifically, to maintain the quality of generated output sequences, the respective threshold values for output time steps that are later in the output sequence can be lower than the respective threshold values for output time steps that are relative earlier in the output sequence. That is, the system maintains the threshold values such that the termination criteria are easier to satisfy at later time steps. This can maintain the quality of generated output sequences because inaccurately selecting the token at earlier time steps can have more of an impact on overall sequence quality due to the auto-regressive nature of the generation process.

As a specific example, the respective threshold values for the output time steps can be determined based on a shared threshold value.

As a particular example, for each layer in the subset, the respective threshold value for each output time step can be generated by applying a decreasing function to the shared threshold value and to a time index of the output time step.

The decreasing function can be any appropriate function that assigns smaller threshold values to time steps with larger time indices. As a particular example, the decreasing function is an exponential function.

More specifically, the function can be a decay function, so that the threshold value $\lambda'$ that is generated from the shared threshold value $\lambda$ at output time step t satisfies:

$$\lambda'(\lambda, t) := \text{clip}_{[0,1]}\left(a\lambda + (1-a)e^{-\tau \cdot \frac{t}{N}}\right),$$

where $\text{clip}_{[0,1]}$ is a function that clips its inputs to the range between zero and one, inclusive, N is the maximum output length, $\tau$ is a temperature value that can be received as input by a user or can be pre-determined, and $\alpha$ is a value between zero and one, exclusive. For example, $\alpha$ can be equal to 0.7, 0.8, or 0.9.

By using a shared threshold value for all layers and generating the threshold value for each time step from the shared threshold value, the system can greatly reduce the search space of possible effective threshold values, thereby allowing the system to readily determine a shared threshold value that results in a high-performing early exiting scheme.

Using these threshold values to determine when the termination criterion is satisfied is described in more detail below with reference to FIG. 3.

Determining a shared threshold value is described in more detail below with reference to FIG. 4.

Once the termination criterion is satisfied, the system processes the updated hidden state for the last input in the current input sequence generated by the layer at which the termination criterion is satisfied to generate a probability distribution over the tokens in the vocabulary (step 208).

As described above, for each layer in the subset, the system maintains a respective output subnetwork for each layer in the subset and for the last layer.

Thus, to generate the probability distribution, the system processes the updated hidden state for the last input in the current input sequence generated by the layer at which the termination criterion is satisfied using the output subnetwork for the layer at which the termination criterion is satisfied to generate the probability distribution.

The system selects the token at the output time step using the probability distribution (step 210). For example, the system can select the token with the highest probability or can sample a token from the probability distribution.

Thus, if the termination criterion is satisfied at a given layer that is before the last layer in the sequence, the system refrains from performing any processing for any additional layers that are after the given layer in the sequence at the output time step.

By not performing the computation for these additional layers when the system determines to "early exit" when generating any given token, the system can generate the output sequence with reduced latency and while consuming fewer processor cycles. However, by making use of thresholds to determine whether to "early exit," the system can maintain high generation quality for the output sequence.

In some implementations, because only the last token in the output sequence has been added to the current input sequence since the preceding output time step and because the causal masking on the self-attention mechanism ensures that hidden states for previously generated tokens are not updated at time steps after the tokens are generated, when performing the processing of any given one of the layers in the decoder, the system re-uses the respective hidden states for the other tokens in the current input sequence that have already been generated rather than re-compute the respective hidden states at each time step when performing step 206.

In these implementations, due to early exiting, for some output time steps, at any given layer there may not be a hidden state stored for one or more layers that precede the given layer in the sequence. That is, if the system did not perform the processing of a given layer when generating a given token at a given time step due to early exiting, the updated hidden state for that layer for that token for that time step will not be available for re-use at later time steps if needed.

For example, if the system determined to early exit after the third layer in the sequence for a particular output token, but, for the next token, has not early exited when processing the next token through the fifth layer in the sequence, the hidden state generated from the particular output token by the fourth layer is not available to be provided as input to the fifth layer in the sequence.

To account for this, the system can make use of state propagation. In state propagation, if the system has early exited at a layer j when generating a token at time step s, for all time steps after s and for all layers after the layer j in the sequence, the system sets the input hidden state for the token at time step s equal to the updated hidden state generated by layer j for the token at time step s. Thus, the system "copies" the last updated hidden state to later layers in the sequence as needed while generating later tokens in the sequence.

Figure 3:
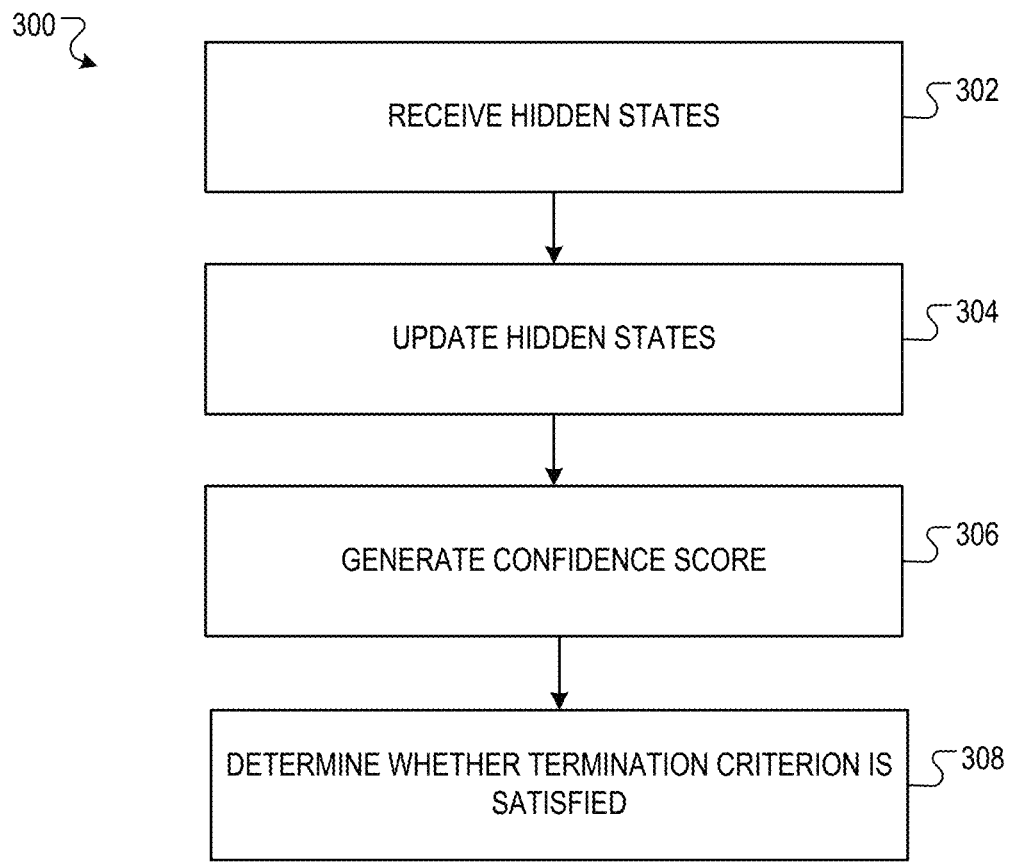
FIG. 3 is a flow diagram of an example process for processing a sequence of hidden states using a layer of the decoder neural network.

FIG. 3 is a flow diagram of an example process 300 for processing a sequence of hidden states using a layer of the decoder neural network. For convenience, the process 300 will be described as being performed by a system of one or more computers located in one or more locations. For example, a sequence generation system, e.g., the sequence generation system 100 depicted in FIG. 1, appropriately programmed in accordance with this specification, can perform the process 300.

The system receives a respective input hidden state for the layer for each input in the current input sequence (step 302).

The system updates the respective input hidden state for each of the inputs in the current input sequence at least in part by applying an attention mechanism using the respective input hidden states (step 304).

For example, the system can process the input hidden states using an attention sub-layer of the layer that applies the attention mechanism to generate an initial updated hidden state for each of the inputs and then processes the initial updated hidden states using a feed-forward sub-layer of the layer to generate the updated input hidden states for the layer.

As described above, when the decoder is part of a decoder-only neural network, the attention mechanism for each layer is a causal (or "masked") self-attention mechanism. When the decoder is part of an encoder-decoder neural network, the attention mechanism for some of the layers is a causal (or "masked") self-attention mechanism while the attention mechanism for the other layers is a cross-attention mechanism that cross-attends into the encoded representation of the network input.

When the layer is not in the subset and is not the last layer in the sequence, the system determines that the termination criteria are not satisfied and provides the updated hidden states as the input hidden states for the next layer in the decoder neural network.

When the layer is in the subset, the system generates a confidence score for the layer from at least the updated respective input hidden state for the last input in the current input sequence generated by the layer (step 306).

The system can generate the confidence score for the layer in any of a variety of ways.

As one example, the system can generate a probability distribution over the tokens in the vocabulary from the updated respective input hidden state for the last input in the current input sequence. For example, the system can process the updated respective input hidden state for the last input in the current input sequence using the output subnetwork for the layer to generate the probability distribution.

The system can then determine the confidence score based on a difference between the highest probability in the probability distribution and the second highest probability in the probability distribution. For example, the confidence score can be equal to the difference or equal to the output of an increasing function applied to the difference.

As another example, the system can determine the confidence score based on a similarity measure between (i) the updated respective input hidden state for the last input in the current input sequence generated by the layer and (ii) the updated respective input hidden state for the last input in the current input sequence generated by the preceding layer in the sequence. For example, the confidence score can be equal to the cosine similarity between (i) the updated respective input hidden state for the last input in the current input sequence generated by the layer and (ii) the updated respective input hidden state for the last input in the current input sequence generated by the preceding layer in the sequence.

As yet another example, the system can process the updated respective input hidden state for the last input in the current input sequence using an early exit classifier to generate the confidence score.

The early exit classifier is a machine learning model that is configured to map an input vector, i.e., an input hidden state, to a confidence score. For example, the early exit classifier can be a linear model. As another example, the early exit classifier can be a multi-layer perceptron (MLP). As yet another example, the early exit classifier can be a Transformer neural network. In this example, the early exit classifier can also receive as input other data, e.g., the other updated hidden states.

In particular, the early exit classifier has been trained, i.e., by the system or by another training system, while holding parameters of the decoder neural network fixed to trained values determined by training the decoder neural network. Thus, adding the early exit classifier does not have any impact on the decoder neural network's underlying performance.

As a particular example, the system can train the early exit classifier on a cross-entropy loss that measures, for each layer in the subset, an error, e.g., a cross-entropy loss, between the confidence score predicted by the early exit classifier by processing the layer's hidden state and an oracle score that is equal to 1 when the highest scoring token in the probability distribution generated from the layer's hidden state is the same as the highest scoring token in the probability distribution generated from the last layer's hidden state and equal to 0 otherwise. For example, the loss for a given output token in a given training sequence can be the average of the errors for the layers in the subset.

The system determines that the termination criterion is satisfied when the confidence score for the layer is greater than or equal to the threshold value for the layer for the output time step (step 308) and determines that the termination criterion is not satisfied when the confidence score for the layer is less than the threshold value for the layer for the output time step.

Figure 4:
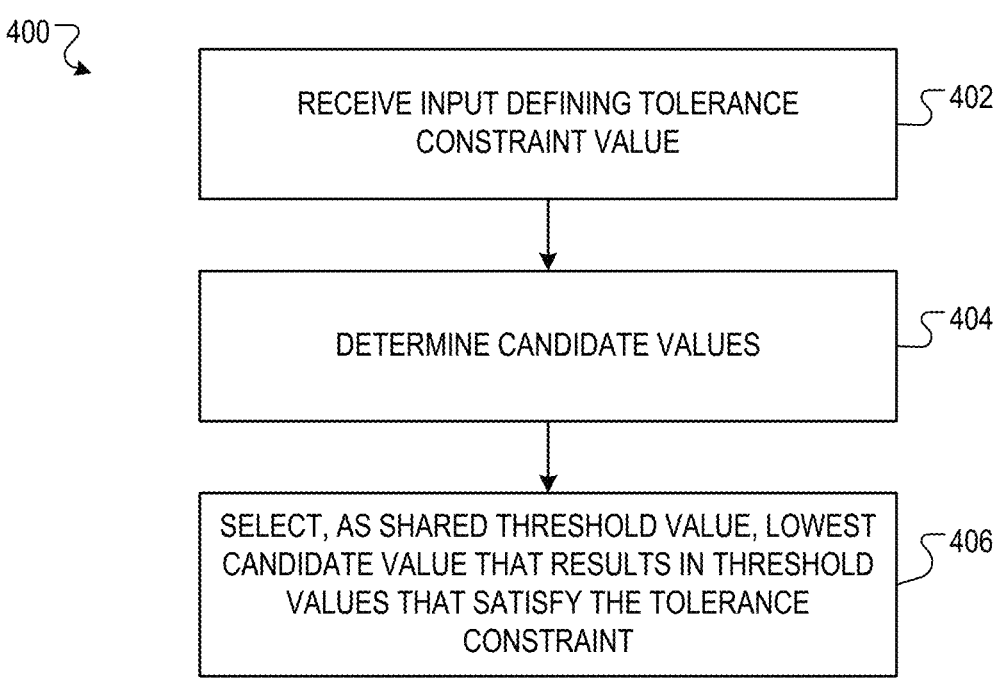
FIG. 4 is a flow diagram of an example process for determining a shared threshold value.

FIG. 4 is a flow diagram of an example process 400 for determining a shared threshold value. For convenience, the process 400 will be described as being performed by a system of one or more computers located in one or more locations. For example, a sequence generation system, e.g., the sequence generation system 100 depicted in FIG. 1, appropriately programmed in accordance with this specification, can perform the process 400.

The system receives, from a user, an input defining a value of a tolerance constraint (step 402).

The tolerance constraint is a constraint on the quality of output sequences generated by using the respective threshold values for the output time steps relative to always generating output sequences using updated hidden states generated by the last layer in the sequence. That is, the tolerance constraint represents an acceptable degradation in quality (or accuracy) when the system employs "early exiting" using threshold values rather than always using the hidden states generated by the last layer.

As one example, the quality of output sequences can be measured using textual consistency. In this example, the decoder neural network is textually consistent, i.e., does not violate the constraint, when the expected text dissimilarity given a network input at inference, as measured by a text dissimilarity function, between (i) an output sequence for the network input generated by using the respective threshold values for the output time steps and (ii) an output sequence for the network input using updated hidden states generated by the last layer in the sequence is less than or equal to the tolerance constraint value.

As another example, the quality of output sequences can be measured using risk consistency. In this example, the decoder neural network is risk consistent, i.e., does not violate the constraint, when the difference between (i) an expected risk for a given network input, as measured by a text risk function, between a) an output sequence for the network input generated by using the respective threshold values for the output time steps and b) a ground truth output sequence for the network input and (ii) an expected risk for the given network input, as measured by the text risk function, between c) an output sequence for the network input using updated hidden states generated by the last layer in the sequence and d) the ground truth output sequence for the network input is less than or equal to the tolerance constraint value.

The system can use any appropriate quality metric m that compares the relative quality of two output sequences for a given task to compute the text consistency or text risk functions. For example, the text consistency function or text risk function for a pair of sequences can be equal to 1−m, where m is the value of the quality metric for the pair of sequences. Examples of such quality metrics m include ROUGE-L, Token-F1, and BLEURT.

The system then determines the shared threshold value based on the tolerance constraint. In particular, the system determines the shared threshold value so that using the shared threshold value in the early exiting scheme does not violate the tolerance constraint.

As one example, the system can determine a plurality of candidate values (step 404). For example, the system can select a set of candidate values that are evenly spaced on a grid of values or that are randomly sampled from the evenly spaced grid of values.

The system can then select, as the shared threshold value, the lowest candidate value that results in respective threshold values that satisfy the tolerance constraint (step 406).

For example, the system can obtain a calibration data set. The calibration data set can be, e.g., provided by or identified by the user as being representative of network inputs that will be processed by the neural network at inference.

The calibration data set includes a set of network inputs, and, when risk consistency is being used, a ground truth (or "gold") output sequence for each network input.

The system can then apply the Learn then Test calibration framework on the calibration data set to determine the subset of the candidate values that does not violate the tolerance constraint (the subset of "valid" candidate values) and then select the smallest candidate value in the subset as the shared threshold value.

Generally, to perform the Learn then Test calibration framework, the system tests the candidate values by computing p-values for candidate values using either the expected text consistency or the expected risk consistency and rejects the candidate values if their p-values are less than or equal to a level value. The level value specifies the probability with which the decoder neural network needs to satisfy the tolerance constraint and can either be pre-determined or received as input from the user along with the tolerance constraint value. Rejected candidate values are determined to be valid candidate values and candidate values that are not rejected are not included in the subset.

As one example, the system can compute the p-value for a given candidate value $\lambda_j$ using the empirical average of a random variable $L_i$ for the network inputs i in the calibration data set, where the random variable $L_i$ is computed using either text consistency or risk consistency.

For example, for text consistency the random variable $L_i$ can be equal to the output of the text dissimilarity function for (i) an output sequence for the network input i generated by using respective threshold values for the output time steps that are derived from the given candidate value $\lambda_j$, i.e., with the shared threshold value set equal to the given candidate value, and (ii) an output sequence for the network input i generated by using updated hidden states generated by the last layer.

As another example, for risk consistency the random variable $L_i$ can be equal to the maximum of zero and the difference between (i) the output of the text risk function for a) an output sequence for the network input i generated by using the respective threshold values for the output time steps that are derived from the given candidate value $\lambda_j$, i.e., with the shared threshold value set equal to the given candidate value and b) a ground truth output sequence for the network input i and (ii) the output of the text risk function for c) an output sequence for the network input i generated using updated hidden states generated by the last layer and d) the ground truth output sequence for the network input i.

For example, the system can set the p-value equal to:

$$e^{-2n((0,\delta-E(\lambda_j)))^2},$$

where n is the total number of network inputs i, $\delta$ is the tolerance constraint value, and $E(\lambda_j)$ is the empirical average of $L_i$ for $\lambda_j$.

As a particular example, to perform the Learn then Test calibration, the system can order the candidate values in descending order starting from the largest candidate value.

The system can proceed to test each candidate value according to the order and, upon failing to reject a given candidate value, designate the preceding candidate value in the order as the shared threshold value.

If the first candidate value is rejected, the system can set the shared threshold value to one, i.e., so that the system does not perform early exiting because it would not result in the decoder neural network satisfying the constraint.

Figure 5:
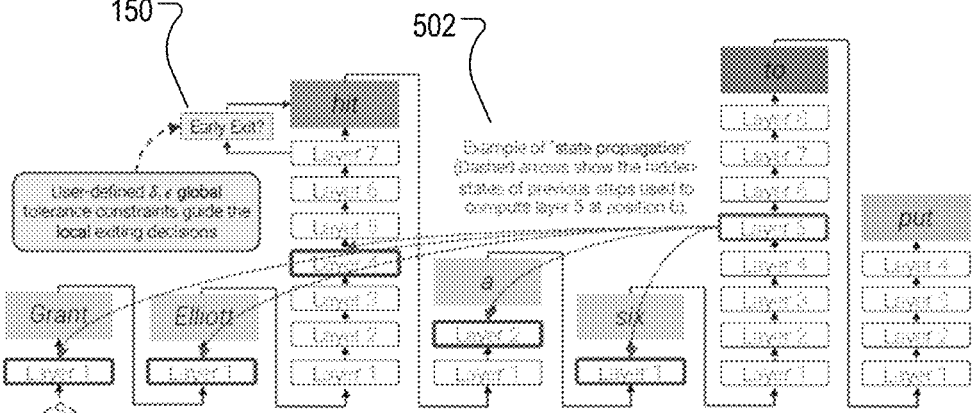
FIG. 5 shows an example of generating an output sequence using early exiting.

FIG. 5 shows an example 500 of generating an output sequence using early exiting.

As shown in FIG. 5, the decoder neural network includes 8 layers, and all of the layers except for the last layer are in the subset.

As shown in FIG. 5, at each output time step (each "position" in the output sequence), the early exiting engine 150 can use early exiting to determine which layer outputs to use to generate the token at the output time step.

For example, in the example of FIG. 5, the system has generated a sequence that includes the tokens "Grant Elliott hit a six to put." When generating the tokens "Grant" and "Elliott," the system uses the outputs of layer 1. However, when generating the token "hit," the system uses the outputs of layer 7 and when generating the token "to" the system uses the outputs of layer 8.

As shown in FIG. 5, the early exiting engine 150 uses threshold values for each time step that have been determined using δ, the tolerance constraint value, and ε, the level value. In the example of FIG. 5, both of these values have been specified by the user in order to indicate the level of accuracy degradation that would be acceptable to the user when generating any given output sequence. Thus, these user-defined values on the "global," i.e., sequence-wide, tolerance for accuracy degradation guide the local, per time step early exiting decisions made by the early exiting engine 150.

FIG. 5 also shows an example 502 of state propagation. In particular, as shown in the example 502, when generating the token at position (output time step) 6, when performing the processing of layer 5, the outputs of layer 4 for the tokens at output time steps 1, 2, 4, and 5 are not available (to be provided as the input hidden states to layer 5) because layer 4 was skipped during the generation of these tokens due to early exiting. Thus, the system uses, as the input hidden states to layer 5 for the tokens at those positions, the updated hidden states generated by the last layer at which processing was performed when generating the tokens at those positions. In the example 502, the system uses (i) as the hidden state at output time step 1, the hidden state generated by layer 1, (ii) as the hidden state at output time step 2, the hidden state generated by the layer 1, (iii) as the hidden state at output time step 4, the hidden state generated by layer 2, and (iv) as the hidden state at output time step 5, the hidden state generated by layer 1.

Thus, by employing state propagation, the system can avoid incurring expending additional processing resources to re-compute hidden states for that were skipped due to early exiting at previous time steps.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for auto regressively generating, using a decoder neural network, an output sequence that includes a respective token from a vocabulary of tokens at each of a plurality of output time steps, wherein the decoder neural network comprises a sequence of layers, wherein the method comprises:

for each layer in a subset of the layers in the sequence, maintaining a respective threshold value for each of the plurality of output time steps, wherein two or more of the output time steps have different respective threshold values; and generating the output sequence by, at each of the plurality of output time steps:

generating a current input sequence from at least the token at a preceding output time step that precedes the output time step in the output sequence;

generating a respective hidden state for each input in the current input sequence;

processing the respective hidden state for each input in the current input sequence through the layers in the sequence of layers until a termination criterion is satisfied, comprising, for each layer starting from the first layer in the sequence and until the termination criterion is satisfied:

receiving a respective input hidden state for the layer for each input in the current input sequence, and updating the respective input hidden state for each of the inputs in the current input sequence at least in part by applying an attention mechanism using the respective input hidden state for each input in the current input sequence;

when the layer is in the subset, generating a confidence score for the layer from at least the updated respective input hidden state for the last input in the current input sequence generated by the layer; and determining that the termination criterion is satisfied when the confidence score for the layer is greater than or equal to the threshold value for the layer for the output time step;

once the termination criterion is satisfied, processing the updated hidden state for the last input in the current input sequence generated by the layer at which the termination criterion is satisfied to generate a probability distribution over the tokens in the vocabulary; and selecting the token at the output time step using the probability distribution.

2. The method of claim 1, wherein the output sequence is conditioned on a network input.

3. The method of claim 2, wherein the current input sequence further comprises one or more inputs corresponding to the network input.

4. The method of claim 2, the method further comprising:

processing at least a portion of the network input using an encoder neural network to generate an encoded representation of at least the portion of the network input, and wherein one or more the layers in the sequence apply cross-attention into the encoded representation.

5. The method of claim 1, wherein generating a respective hidden state for each input in the current input sequence comprises:

processing the token at the preceding output time step using an embedding layer.

6. The method of claim 1, wherein processing the respective hidden state for each input in the current input sequence through the layers in the sequence of layers until a termination criterion is satisfied comprises:

determining that the termination criterion is satisfied after the last layer in the sequence when none of the confidence scores for any of the layers in the subset are greater than or equal to the threshold value for the layer for the output time step.

7. The method of claim 1, wherein processing the respective hidden state for each input in the current input sequence through the layers in the sequence of layers until a termination criterion is satisfied comprises: once the termination criterion is satisfied at a given layer in the sequence, refraining from performing any processing for any additional layers that are after the given layer in the sequence at the output time step.

8. The method of claim 1, wherein generating a confidence score for the layer from at least the updated respective input hidden state for the last input in the current input sequence comprises:

generating a probability distribution over the tokens in the vocabulary from the updated respective input hidden state for the last input in the current input sequence; and determining the confidence score based on a difference between a highest probability in the probability distribution and a second highest probability in the probability distribution.

9. The method of claim 1, wherein generating a confidence score for the layer from at least the updated respective input hidden state for the last input in the current input sequence comprises:

determining the confidence score based on a similarity measure between (i) the updated respective input hidden state for the last input in the current input sequence generated by the layer and (ii) the updated respective input hidden state for the last input in the current input sequence generated by the preceding layer in the sequence.

10. The method of claim 1, wherein generating a confidence score for the layer from at least the updated respective input hidden state for the last input in the current input sequence comprises:

processing the updated respective input hidden state for the last input in the current input sequence using an early exit classifier to generate the confidence score.

11. The method of claim 10, wherein the early exit classifier has been trained while holding parameters of the decoder neural network fixed to trained values determined by training the decoder neural network.

12. The method of claim 1, wherein, for each layer in the subset, the respective threshold values for output time steps that are later in the output sequence are lower than the respective threshold values for output time steps that are relative earlier in the output sequence.

13. The method of claim 1, wherein, for each layer in the subset, the respective threshold values for the output time steps are determined based on a shared threshold value.

14. The method of claim 13, wherein, for each layer in the subset, the respective threshold value for each output time step is generated by applying a decreasing function to the shared threshold value and to a time index of the output time step.

15. The method of claim 13, wherein the decreasing function is an exponential function.

16. The method of claim 13, further comprising:

receiving, from a user, an input defining a value of a tolerance constraint on a quality of output sequences generated by using the respective threshold values relative to always generating output sequences using updated hidden states generated by the last layer in the sequence; and determining the shared threshold value based on the tolerance constraint.

17. The method of claim 16, wherein determining the shared threshold value based on the one or more tolerance constraints comprises:

determining a plurality of candidate values; and selecting, as the shared threshold value, the lowest candidate value that results in respective threshold values that satisfy the tolerance constraint.

18. One or more non-transitory computer-readable storage media storing instructions that when executed by one or more computers cause the one or more computers to perform operations for auto-regressively generating, using a decoder neural network, an output sequence that includes a respective token from a vocabulary of tokens at each of a plurality of output time steps, wherein the decoder neural network comprises a sequence of layers, and wherein the operations comprise:

for each layer in a subset of the layers in the sequence, maintaining a respective threshold value for each of the plurality of output time steps, wherein two or more of the output time steps have different respective threshold values; and generating the output sequence by, at each of the plurality of output time steps:

generating a current input sequence from at least the token at a preceding output time step that precedes the output time step in the output sequence;

generating a respective hidden state for each input in the current input sequence;

processing the respective hidden state for each input in the current input sequence through the layers in the sequence of layers until a termination criterion is satisfied, comprising, for each layer starting from the first layer in the sequence and until the termination criterion is satisfied:

receiving a respective input hidden state for the layer for each input in the current input sequence, and updating the respective input hidden state for each of the inputs in the current input sequence at least in part by applying an attention mechanism using the respective input hidden state for each input in the current input sequence;

when the layer is in the subset, generating a confidence score for the layer from at least the updated respective input hidden state for the last input in the current input sequence generated by the layer; and determining that the termination criterion is satisfied when the confidence score for the layer is greater than or equal to the threshold value for the layer for the output time step;

once the termination criterion is satisfied, processing the updated hidden state for the last input in the current input sequence generated by the layer at which the termination criterion is satisfied to generate a probability distribution over the tokens in the vocabulary; and selecting the token at the output time step using the probability distribution.

19. A system comprising:

one or more computers; and one or more storage devices storing instructions that, when executed by the one or more computers, cause the one or more computers to perform the operations auto-regressively generating, using a decoder neural network, an output sequence that includes a respective token from a vocabulary of tokens at each of a plurality of output time steps, wherein the decoder neural network comprises a sequence of layers, and wherein the operations comprise:

for each layer in a subset of the layers in the sequence, maintaining a respective threshold value for each of the plurality of output time steps, wherein two or more of the output time steps have different respective threshold values; and generating the output sequence by, at each of the plurality of output time steps:

generating a current input sequence from at least the token at a preceding output time step that precedes the output time step in the output sequence;

generating a respective hidden state for each input in the current input sequence;

processing the respective hidden state for each input in the current input sequence through the layers in the sequence of layers until a termination criterion is satisfied, comprising, for each layer starting from the first layer in the sequence and until the termination criterion is satisfied:

receiving a respective input hidden state for the layer for each input in the current input sequence, and updating the respective input hidden state for each of the inputs in the current input sequence at least in part by applying an attention mechanism using the respective input hidden state for each input in the current input sequence;

when the layer is in the subset, generating a confidence score for the layer from at least the updated respective input hidden state for the last input in the current input sequence generated by the layer; and determining that the termination criterion is satisfied when the confidence score for the layer is greater than or equal to the threshold value for the layer for the output time step;

once the termination criterion is satisfied, processing the updated hidden state for the last input in the current input sequence generated by the layer at which the termination criterion is satisfied to generate a probability distribution over the tokens in the vocabulary; and selecting the token at the output time step using the probability distribution.

20. The system of claim 19, wherein processing the respective hidden states for the inputs through the layers comprises: once the termination criterion is satisfied at a given layer in the sequence, refraining from performing any processing for any additional layers that are after the given layer in the sequence at the output time step.

* * * * *